United States Patent [19]

Mertz et al.

[11] Patent Number: 5,382,009
[45] Date of Patent: Jan. 17, 1995

[54] PORTABLE HINGED CUTTING BOARD WITH DRAWER

[75] Inventors: Dyanna Mertz; John C. Mertz, both of Mansfield, Ohio

[73] Assignee: Recreations, Inc., Mansfield, Ohio

[21] Appl. No.: 79,679

[22] Filed: Jun. 18, 1993

[51] Int. Cl.[6] .............................................. B23Q 3/00
[52] U.S. Cl. ............................ 269/16; 269/289 R; 269/302.1; 312/330.1; 312/317.1
[58] Field of Search ............... 312/330.1, 311, 334.44, 312/317.1; 269/15, 16, 289 R, 302.1

[56] References Cited

U.S. PATENT DOCUMENTS

| 157,283 | 12/1874 | Gurney | 269/16 |
|---|---|---|---|
| 227,179 | 5/1880 | Robbins | 312/311 |
| 331,029 | 11/1885 | Black | 269/16 |
| 365,245 | 6/1887 | De Graff | 312/311 |
| 744,576 | 11/1903 | Ligon | 269/302.1 |
| 1,497,228 | 6/1924 | Purdy | 269/302.1 |
| 1,724,408 | 8/1929 | Miller | 312/334.44 |
| 2,534,100 | 12/1950 | Baumgartner | 312/334.44 |
| 5,085,416 | 2/1992 | Miyake et al. | 269/289 R |

*Primary Examiner*—Robert C. Watson
*Attorney, Agent, or Firm*—Jerry W. Semer

[57] ABSTRACT

A portable hinged cutting board with drawer for recreational use, such as the popular picnic, is presented having a housing 10 with a folding extension 11 attached by a hinge means 12 to the top edge along the length of the housing 10. The folding extension 11 corresponds in length and width with top of the housing thereby when folded in a closed position it is adjacent to the upper surface of the housing top 10a. The housing 10 can generally be described as having a rectangular top 10a two short sides 10b one long side 10c thereby forming a compartment 10e. A drawer 13 fits snugly into the compartment 10e and is of such a width that when positioned inside as in the closed position the outer wall 13a of the drawer 13 is flush with the edges of the housing 10. The drawer is held in the closed position inside the housing by a fastening means 18 thereby preventing the drawer from opening during transport. The drawer 13 is extended as far as possible until it is restricted by a stopping means 19 from removal from the the housing 10. The folding extension 11 is rotated along the axis of the hinge 12 resting in a position on top of the drawer 13 thereby doubling the area available for food preparation by combining the upper surface of the housing top 10a and the adjacent surface 11a of the folding extension 11 which are aligned on the same plane forming a cutting "board" area.

13 Claims, 4 Drawing Sheets

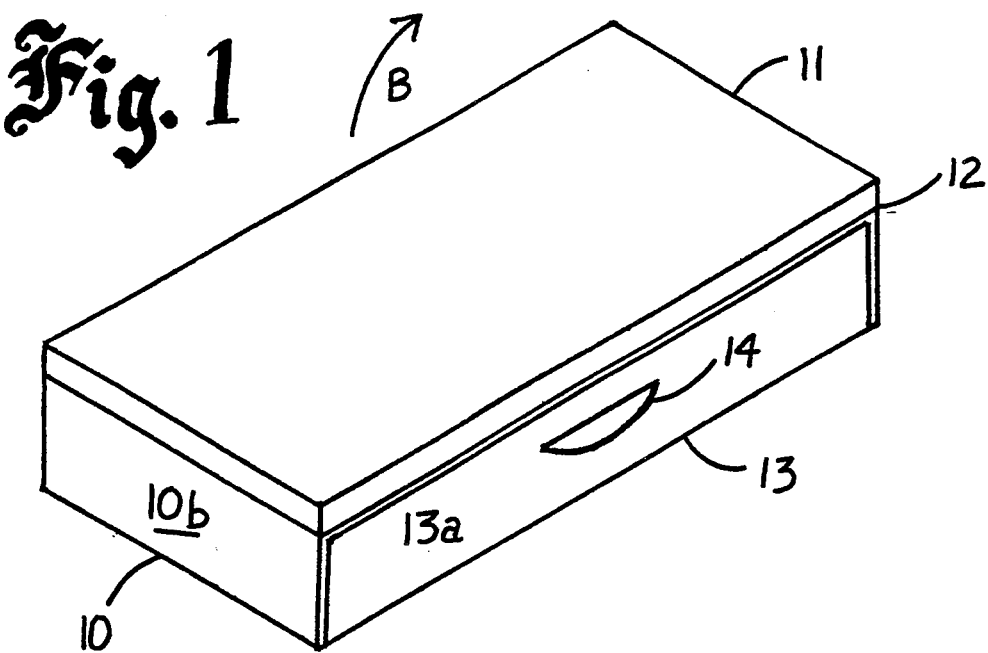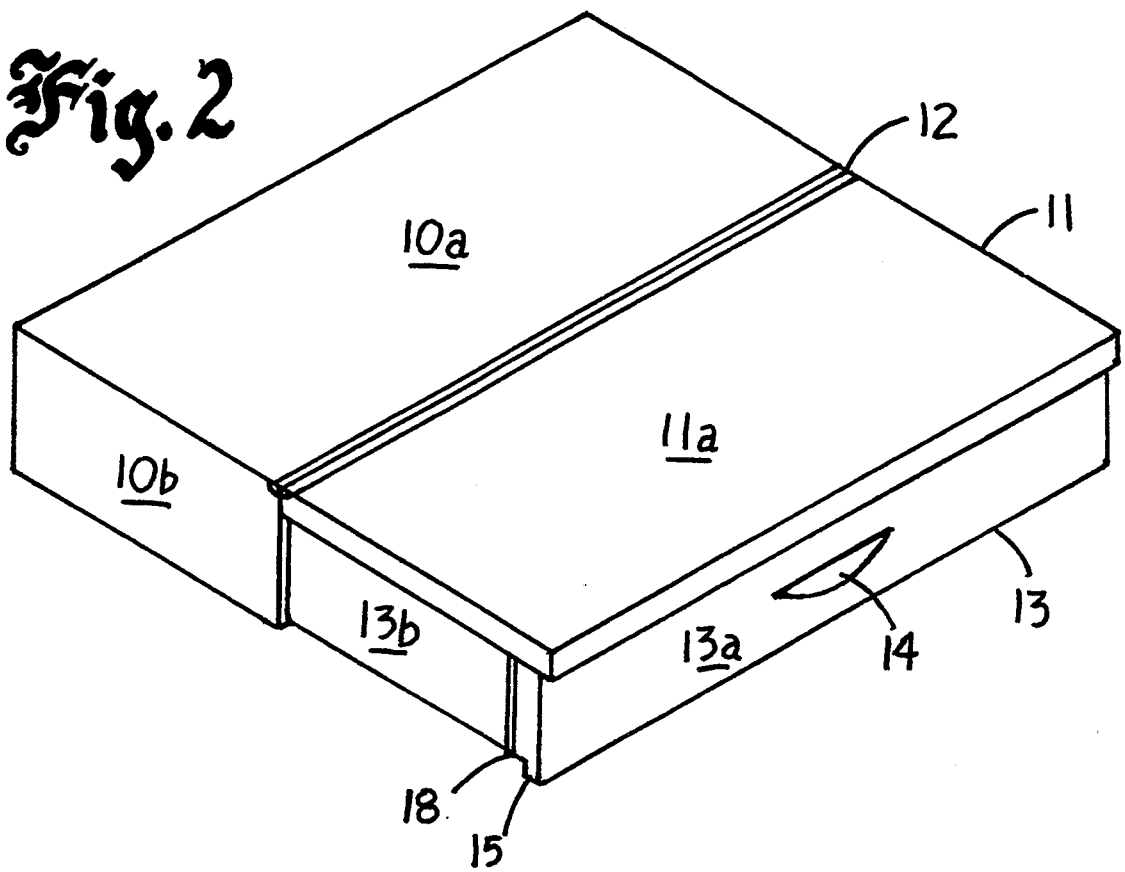

PORTABLE HINGED CUTTING BOARD WITH DRAWER

FIELD OF THE INVENTION

This invention relates generally to the field of cutting boards and more particularly to the field of portable cutting boards used for recreational activities such as the popular picnic or camping.

BACKGROUND OF THE INVENTION

One of tile most popular human recreational activities is going on a picnic wherein a variety of food and beverages are packed for travel to a desired location. In many instances it is desirable to prepare food at the picnic site, thus it becomes necessary to transport a variety of food preparation implements. It is also necessary to have utensils such as knives, forks and spoons. Usually, all the needed items are packed in a container, such as the common picnic basket, thus space becomes a significant factor.

DESCRIPTION OF THE PRIOR ART

To facilitate food preparation, especially the picnic items of fruits, cheeses, meats and vegetables, the desirable means is a cutting board. The preferred dimensions for a cutting board vary with consumers, however a typical cutting board size that is popular is approximately 32.5 centimeters by 25.5 centimeters (13 inches by 10 inches) which is a cumbersome size to transport for a picnic. Utensils require storage in a container or need to be individually wrapped. Also, sanitary conditions for the cutting board and utensils are desirable wherein the surface of the cutting board and the utensils should be covered. When the food, drinking containers, plates, utensils and miscellaneous items are packed for the picnic it is necessary to utilize the available space in the most efficient manner. Therefore, a disadvantage is suffered due to the bulk of items one wishes to transport and the desire to transport said items in the smallest possible container as a matter of convenience. Still another disadvantage is the inconvenience realized because it takes more time to pack a variety of separate items.

SUMMARY OF THE INVENTION

The present invention is a portable hinged cutting board with drawer having a housing with a folding extension attached to the top edge along the length of the housing. The folding extension corresponds in length and width with top of the housing so when it is folded in a one position it is adjacent to the upper surface of the housing. The housing can generally be described as having a rectangular top and bottom and three sides with an opening along the longest side, thus forming a compartment. A drawer fits snugly into the compartment and is of such a width that when positioned inside an outer wall is flush with the edges of the opening along the length of the housing. When the drawer is extended as far as possible the folding extension is moved to a position on top of the drawer thereby doubling the area of the housing top for use as a clean surface for food preparation such as cutting and chopping. The drawer has a leveling lip along the bottom of the outside wall corresponding in thickness with the bottom of the housing, thus assuring that the upper plane of the drawer is parallel to the plane of the housing top when the drawer is in the extended position. The top of the housing and the folding extension are the same thickness with the bottom edge of the top forming top edge of the opening. Therefore, when the folding extension is positioned on top of the drawer the top of the housing and the surface of the extension now facing up are on the same plane, thus forming a smooth surface. The length, width and height inside the drawer is of sufficient size to accommodate utensils such as knives, spoons and forks. Ideally, the invention is constructed of durable plastic, thus making it easy to manufacture for mass marketing and also to facilitate cleaning.

OBJECTS AND ADVANTAGES OF THE INVENTION

Accordingly, besides the objects and advantages of the portable hinged cutting board with drawer described in our above patent, several objects and advantages of the present invention are:

(a) to provide an apparatus for picnic activities that improves convenience by combining a utensil storage means and a clean surface for food preparation;

(b) to provide an apparatus for picnic activities that reduces the space needed to transport separate items by combining a utensil storage means and a clean surface for food preparation;

(c) to provide an apparatus for picnic activities that improves sanitary conditions for transporting a cutting board wherein the cutting surface folds in half with the cutting surfaces adjacent to one another when in a closed position;

(d) to provide an apparatus for picnic activities that improves sanitary conditions for transporting eating utensils wherein the utensils are stored in an enclosed drawer;

(e) to provide an apparatus for picnic activities that improves conveniences in space and sanitation thus creating a mass market product for manufacturers of picnic products;

(f) to provide an apparatus for picnic activities that is constructed of plastic thereby making it widely available to consumers due to the low cost.

Therefore, in the accomplishment of the foregoing objects and advantages, the invention having the features hereafter fully described and particularly pointed out in the claims, the accompanying drawings and following disclosures describing in detail the invention, however illustrating but one of the various ways in which the invention may be practiced, wherein:

BRIEF DESCRIPTION OF THE DRAWINGS

FIG. 1 shows an elevated perspective view of a preferred portable hinged cutting board with drawer of the present invention with a folding extension in a closed position for transport.

FIG. 2 shows an elevated perspective view of this invention with the drawer extended and the folding extension in an open position for use as a cutting board.

DETAILED DESCRIPTION OF THE DRAWINGS

Figure 3:
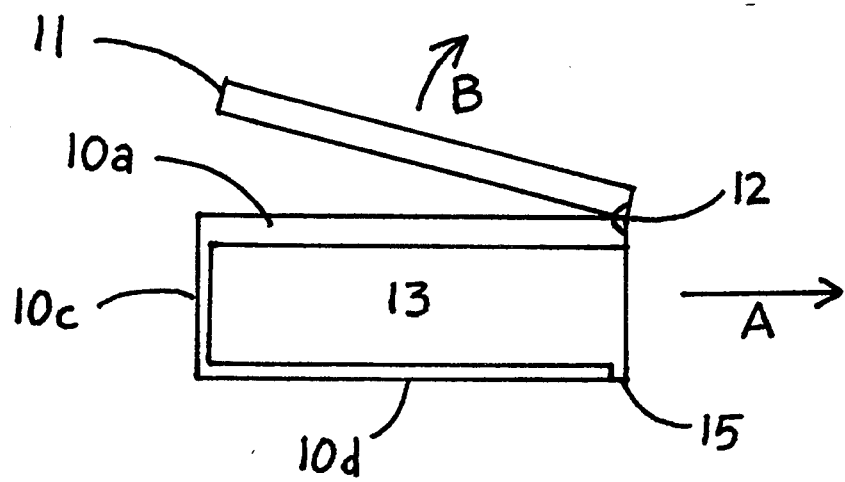
FIG. 3 shows a cross-sectional side view with the drawer inside the housing and the folding extension partially extended.
Figure 4:
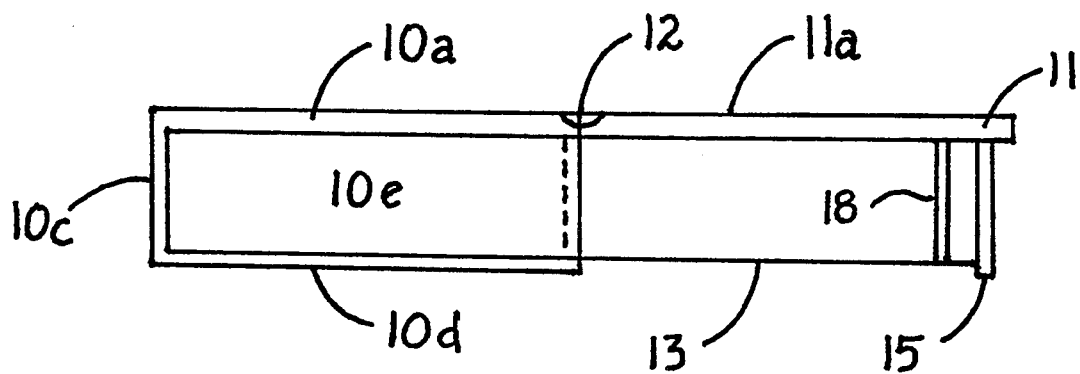
FIG. 4 shows a cross-sectional side view with the drawer in the extended position and the folding extension in a fully extended position.

A preferred embodiment of our portable hinged cutting board with drawer is shown in FIGS. 1-6. The invention has a housing 10 with a folding extension 11 attached by a hinge means 12 to the top edge along the length of the housing 10. The folding extension 11 corresponds in length and width with top of the housing 10 thereby when folded in a closed position (See FIG. 1) it is adjacent to the upper surface of the housing top 10a (shown in FIG. 2). The housing 10 can generally be described as having a rectangular top 10a two short sides 10b one long side 10c thereby forming a compartment 10e. A drawer 13 fits snugly into the compartment 10e and is of such a width that when positioned inside as in the closed position (FIG. 1) the outer wall 13a of the drawer 13 is flush with the edges of the housing 10.

FIG. 2 and FIGS. 4-6 show the drawer 13 extended (Motion A) as far as possible restricted by stopping means 19 (see FIG. 6) from removal from housing 10. The drawer 13 can be removed from the housing 10 if held at a slight angle, thus rendering the stopping means 19 ineffective. The drawer 13 is a produced separately so it must be designed so that it can be easily inserted into the housing 10 when assembled during the process of manufacturing and easily removed for periodic cleaning. The folding extension 11 is rotated (Motion B) along the axis of the hinge 12 resting in a position on top of the drawer 13 thereby doubling the area available for food preparation by combining the upper surface of the housing top 10a and the adjacent surface 11a of the folding extension 11 which are aligned on the same plane. The drawer 13 has a handle 14 and a leveling lip 15 along the bottom of the outer wall 13a. The thickness of the leveling lip 15 corresponds with the thickness of the housing bottom 10d thereby aligning the upper plane of the drawer 13 in a position that is parallel to the plane of the housing top 10a when the drawer 13 is in the extended position. Additionally, the housing top 10a and the folding extension 11 are the same thickness with the bottom surface of the housing top 10a thereby forming the ceiling of the compartment 10e which holds the drawer 13.

Figure 5:
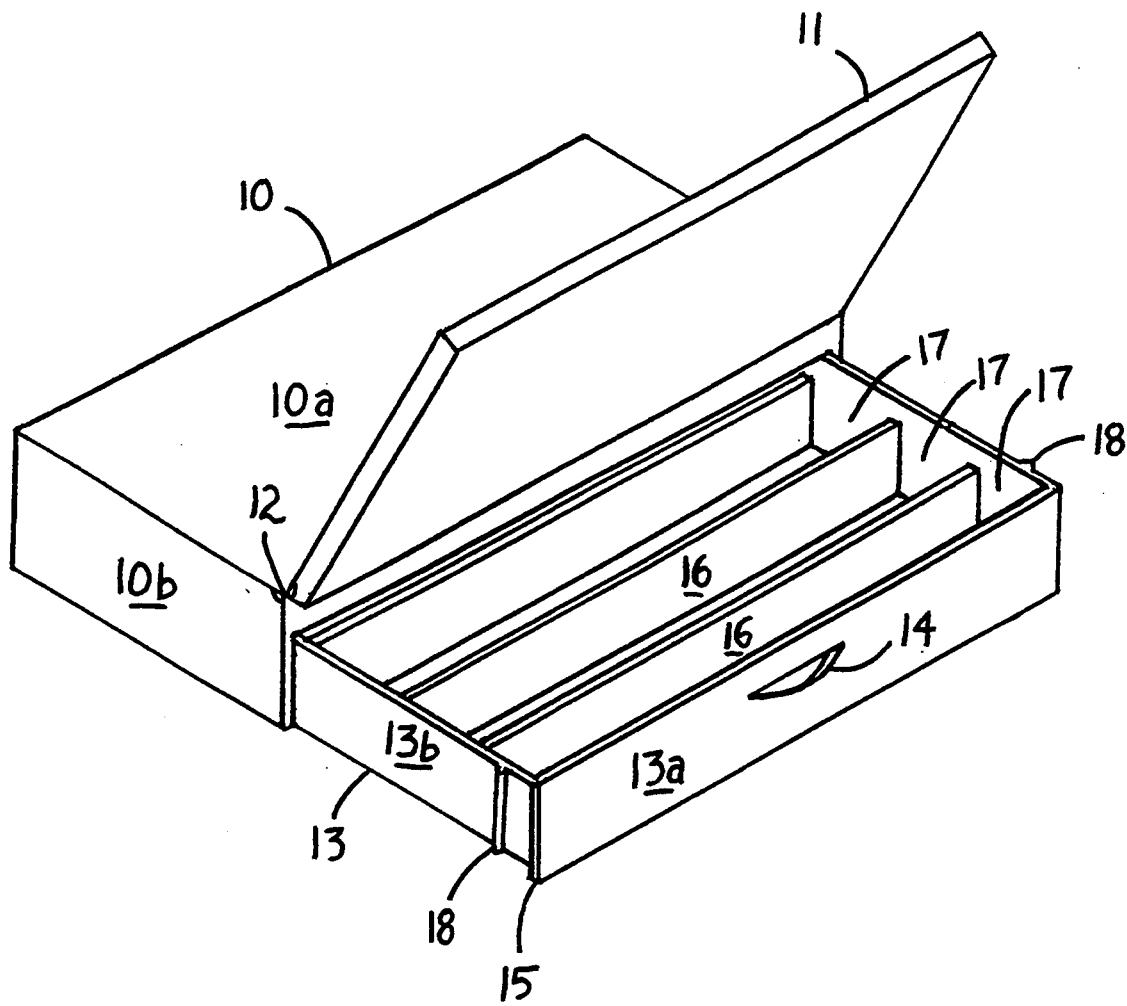
FIG. 5 shows an elevated perspective view of this invention with the drawer fully extended and the folding extension partially extended.

FIG. 5 shows the drawer 13 extended from the housing 10. In one possible preferred embodiment of this invention the drawer 13 has a plurality of walls 16 that divide the inside of the drawer 13 into a plurality of utensil storage compartments 17. The length, width and height inside the drawer is of sufficient size to accommodate utensils such as knives, spoons and forks.

Figure 6:
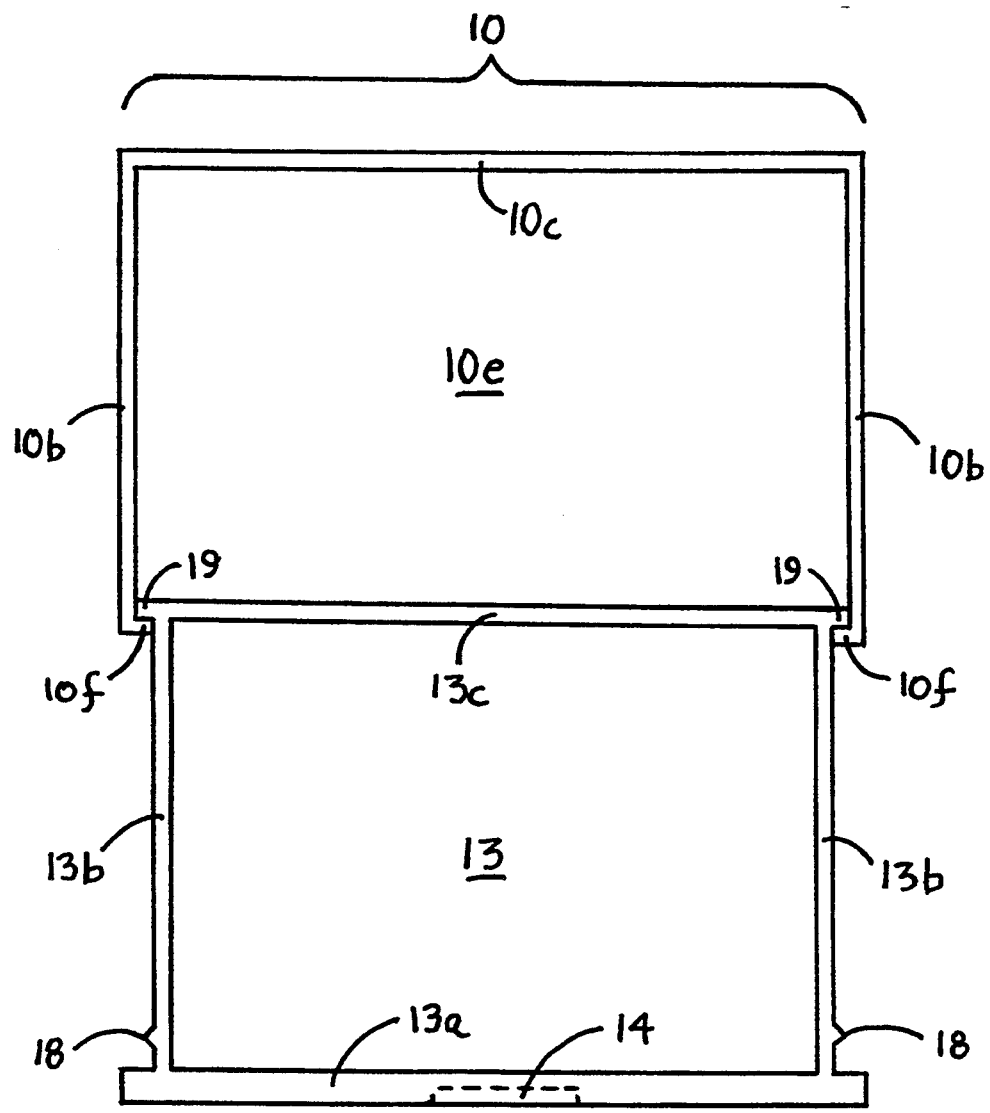
FIG. 6 shows a top cross-sectional view of the housing and drawer of this invention detailing the stopping means for the drawer and the fastening means for the drawer within the compartment of the housing.

FIG. 6 shows the drawer 13 extended from the housing 10. When the vertical ribs 19 attached to the back vertical wall 13c of the drawer 13 come in contact with the vertical ribs 10f attached to the inside edges of the vertical side walls 13b of the drawer 13 the drawer 13 is restricted from removal from the housing 10. Also, when the drawer 13 is in a closed position inside of the housing 10 the tabs 18 attached to the outside vertical drawer walls 13b come in contact with the vertical ribs 10f attached to the inside edges of the vertical side walls 10b of the housing 10 thereby holding the drawer 13 in the closed position inside of the housing 10.

Some possible preferred dimensions for the portable hinged cutting board with drawer of our present invention are a length of 25.5 centimeters (10 inches) a width of 16.5 centimeters (6.5 inches) and a depth of 6.5 centimeters (2.5 inches). Other preferred dimensions would be larger for use of the portable hinged cutting specifically for the popular barbecue. An example would be a length of 35.5 centimeters (14 inches) width of 23 centimeters (9 inches) and a depth of 9 centimeters (3.5 inches) thereby creating a drawer large enough for barbecue utensils such as the spatula and long fork. Also, an enlarged cutting board surface would be created to provide a convenient area for placement of food as it is being prepared or after cooking is completed.

Ideally, the invention is constructed of durable plastic, thus making it easy to manufacture by plastic injection molding and affordable for mass marketing. The mold could be engineered to make the hinge 12 a "living hinge" herein a flexible seam is formed between the housing 10 and folding extension 11. Also, the same engineering makes it possible to have a "pressure fit" fastening means 18 (See FIG. 6) for the drawer 13 when in the closed position inside the compartment 10e of the housing 10 thus holding the drawer 13 firmly in place and preventing accidental extension. The mold should provide a rough texture for the upper surface of the housing top 10a and aligned cutting surface 11a of the folding extension 11 for the advantage of a "non-skid surface and resulting safety benefits. In addition, plastic makes cleaning easier and it is "dishwasher safe", thus improving sanitary conditions.

Another alternative is to construct the portable hinged cutting board with drawer entirely from wood for decorative benefits and improved sanitary conditions if the wood is a particular kind from which microorganisms can be easily removed. Still another alternative is to have the top panel 10a of the housing 10 and the folding extension 11 constructed of wood with the drawer 13, two short sides 10b, one long side 10c and the bottom 10d of the housing 10 constructed of plastic. Also, the fastening means 18 could be replace with a latch assembly (not shown).

The foregoing disclosure and description of the invention are illustrative and explanatory thereof, and various changes in the materials, shape and size, as well as in the details of the illustrated construction, may be made without departing from the spirit of the invention. Thus the scope of the invention should be determined by the appended claims and their legal equivalents, rather than by the examples given.

We claim:

1. A portable hinged cutting board with drawer comprising, (a) a housing comprising a rigid rectangular horizontal top panel, a rigid rectangular horizontal bottom panel, three contiguous vertical sides and said top panel, said bottom panel and said vertical sides form a compartment wherein the fourth side of said compartment is open and the top of said top panel has a top edge that runs along said fourth open side of said compartment;

(b) a second rigid rectangular horizontal panel which corresponds in length and width with the top panel with a top and a bottom and said second panel is rotatably attached to said top panel of said housing wherein in a closed position the top of said top panel and the top of said second panel are adjacent to each other, in the open position the top of said top panel and the top of said second panel form and open surface in alignment on the same plane;
(c) a slidable drawer with a horizontal bottom, a contiguous vertical back wall, a contiguous vertical side walls inside said housing and when said drawer is slid out from said housing said drawer forms a support means for said second panel when said second panel is in said open position.

2. A portable hinged cutting board with drawer comprising:
(a) a housing comprising a rigid rectangular horizontal top panel, a rigid rectangular horizontal bottom panel, three contiguous vertical sides and said top panel, said bottom panel and said vertical sides form a compartment wherein the fourth side of said compartment is open and the top of said top panel has a top edge that runs along said fourth open side of said compartment;
(b) a second rigid rectangular horizontal panel with a top and a bottom and said second panel is rotatably attached to said top panel of said housing wherein in a closed position the top of said top panel and the top of said second panel are adjacent to each other, in the open position the top of said top panel and the top of said second panel form and open surface in alignment on the same plane;
(c) a slidable drawer with a horizontal bottom, a contiguous vertical back wall, a contiguous vertical side walls inside said housing and when said drawer is slid out from said housing said drawer forms a support means for said second panel when said second panel is in said open position;
(d) a means for leveling said top panel and said second panel in said open position wherein said top panel and said second panel aligned to form a flat surface.

3. The portable hinged cutting board with drawer of claim 1 wherein the height and length of of said drawer enables the storage of a plurality of human eating utensils.

4. The portable hinged cutting board with drawer of claim 1 wherein said drawer has a plurality of contiguous rigid vertical panels inside said drawer wherein said panels are parallel to the long sides of said drawer and perpendicular to the bottom of said drawer wherein said panels are contiguously joined to said vertical sides of said drawer thereby forming a plurality of compartments inside said drawer.

5. The portable hinged cutting board with drawer of claim 1 wherein removal of said drawer from said housing is prevented by stopping means.

6. A portable hinged cutting board with drawer comprising:
(a) a housing comprising a rigid rectangular horizontal top panel, a rigid rectangular horizontal bottom panel, three contiguous vertical sides and said top panel, said bottom panel and said vertical sides form a compartment wherein the fourth side of said compartment is open and the top of said top panel has a top edge that runs along said fourth open side of said compartment;
(b) a second rigid rectangular horizontal panel with a top and a bottom and said second panel is rotatably attached to said top panel of said housing wherein in a closed position the top of said top panel and the top of said second panel are adjacent to each other, in the open position the top of said top panel and the top of said second panel form and open surface in alignment on the same plane;
(c) a slidable drawer with a horizontal bottom, a contiguous vertical back wall, a contiguous vertical side walls inside said housing and when said drawer is slid out from said housing said drawer forms a support means for said second panel when said second panel is in said open position and said drawer is maintained in the closed position inside said compartment of said housing by a fastening means.

7. The portable hinged cutting board with drawer of claim 1 wherein said housing, said second rigid horizontal panel and said drawer are constructed from plastic.

8. The portable hinged cutting board with drawer of claim 1 wherein the top of said rigid horizontal top panel of said housing and the aligned top of said second rigid horizontal panel when said second panel is in said open position have a course texture thereby preventing the food being prepared on said open surface from slippage.

9. The portable hinged cutting board with drawer of claim 1 wherein said rigid horizontal top panel of said housing and said second rigid horizontal panel are the same thickness thereby when said second panel is in said open position therein the top of said top panel of said housing and said aligned top of said second panel are in alignment on the same plane.

10. The portable hinged cutting board with drawer of claim 2 wherein said means for leveling is a leveling lip attached to the lower edge of said vertical front wall of said drawer that is adapted to hold said drawer in a desired position that said drawer when supporting said second panel in said open position will support said second panel such that said top of said second panel aligns with said top of said first top panel of said housing to form a flat surface in alignment on the same plane.

11. The portable hinged cutting board of claim 10 wherein said leveling lip is the same thickness as said horizontal bottom panel of said housing.

12. A portable hinged cutting board comprising:
(a) a housing comprising a rigid rectangular horizontal top panel, a rigid rectangular horizontal bottom panel, three contiguous vertical sides and said top panel, said bottom panel and said vertical sides form a compartment wherein the fourth side of said compartment is open and the top of said top panel has a top edge that runs along said fourth open side of said compartment;
(b) a second rigid rectangular horizontal panel with a top and a bottom and said second panel is rotatably attached to said top panel of said housing wherein in a closed position the top of said top panel and the top of said second panel are adjacent to each other, in the open position the top of said top panel and the top of said second panel form and open surface in alignment on the same panel;
(c) a slidable drawer with a horizontal bottom, a contiguous vertical back wall, a contiguous vertical side walls inside said housing and when said drawer is slid out from said housing said drawer forms a support means for said second panel when said second panel is in said open position;
(d) wherein the removal of said drawer from said housing is prevented by a stopping means comprising:
(1) a first plurality of vertical ribs attached to the back vertical wall of said drawers;
(2) a second plurality of vertical ribs attached to the inside of vertical edge of said vertical side of said housing wherein said first ribs and said second ribs come in contact when said drawer is slid out to said open position whereby preventing the removable of said drawer from said housing.

13. The portable hinged cutting board of claim 6 wherein the fastening means in combination, comprising:

(a) a plurality of vertical ribs attached to the inside vertical edge of said vertical side of said housing;
(b) a plurality of tabs attached in a desired position the outside of said vertical wall of said drawer wherein when said drawer is inside said housing said tabs come into contact with said ribs thereby holding a drawer firmly in place inside the housing.

* * * * *